Jan. 8, 1929.
W. B. MATHEWSON
1,698,023
GREASE PUMP
Filed Oct. 27, 1927    2 Sheets-Sheet 1
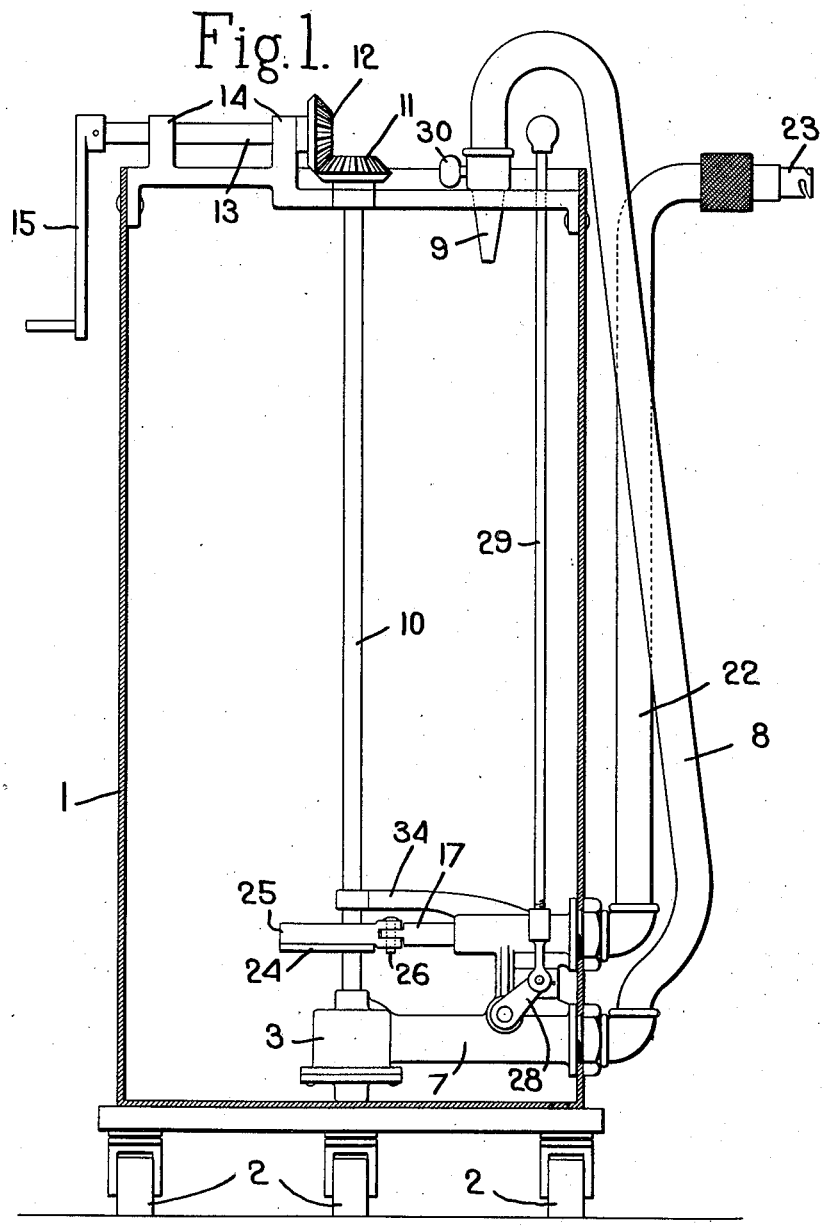
Inventor.
Wilfred B. Mathewson
by Heard Smith & Tennant.
Attys.

Jan. 8, 1929. 1,698,023
W. B. MATHEWSON
GREASE PUMP
Filed Oct. 27, 1927 2 Sheets-Sheet 2
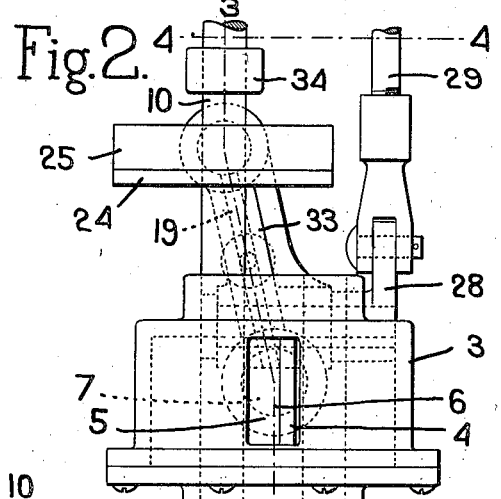
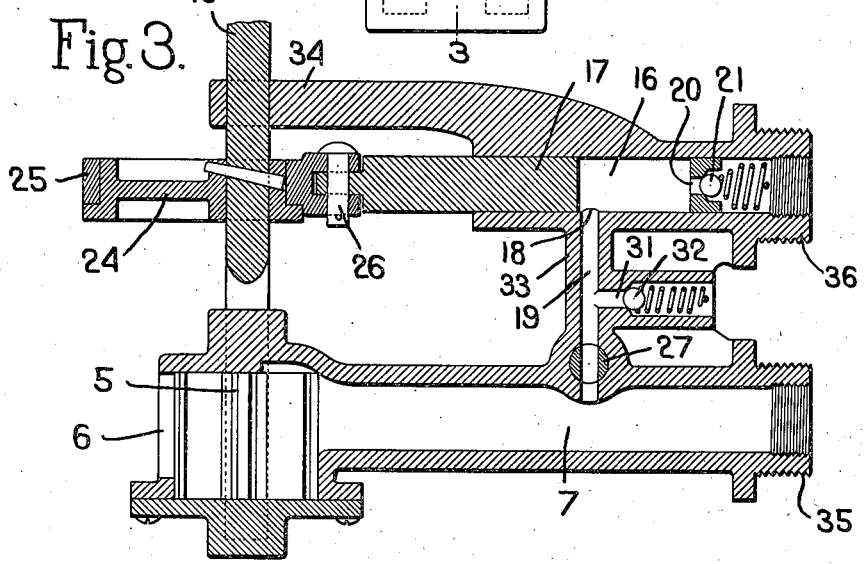
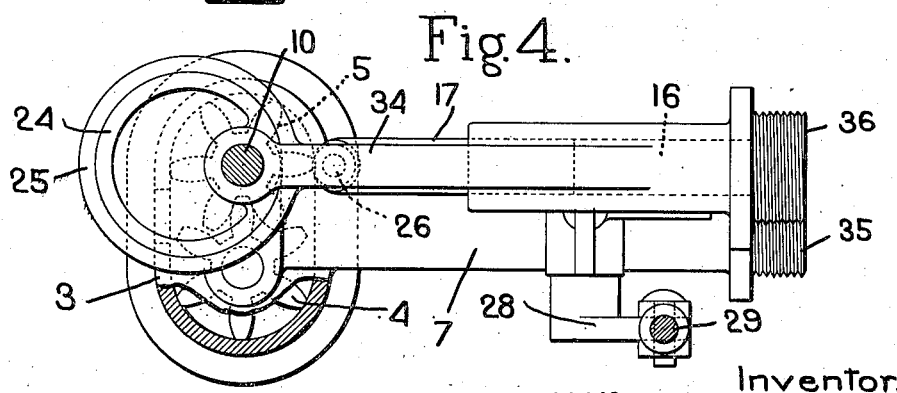
Inventor.
Wilfred B. Mathewson
by Heard Smith & Tennant.
Attys.

Patented Jan. 8, 1929.

1,698,023

UNITED STATES PATENT OFFICE.

WILFRED B. MATHEWSON, OF NORTH WEYMOUTH, MASSACHUSETTS.

GREASE PUMP.

Application filed October 27, 1927. Serial No. 229,167.

This invention relates to grease pumps of the general type shown in the Thornton Patent No. 1,564,799 and it has for its general object to provide a grease pump of this type with a high pressure attachment.

The device illustrated in said patent comprises a container, a gear pump therein, and a delivery pipe or hose connected to the discharge of the pump and by which the grease delivered from the pump is directed to the location where lubrication is desired.

One important use to which devices of this sort are put is the filling of differential housings, transmission casings, etc. of an automobile. In the lubricating of an automobile, however, there are many bearings that frequently require the application of high pressure in order to force the lubricant into the bearing and as stated above one purpose of the present invention is to provide a grease pump of the type illustrated in said patent with a high pressure attachment by which the necessary high pressure may be developed. Usually the bearings which require high pressure lubricant demand considerably less lubricating material than the places where low pressure is sufficient and in the present invention I have arranged the high pressure unit so that it will deliver a less volume of grease than the gear pump, the latter being in the nature of a relatively large volume low pressure unit as compared with the smaller volume high pressure attachment.

The high pressure attachment is in the form of a cylinder having a plunger therein, the inlet of the cylinder communicating with the outlet or discharge of the gear pump and the plunger of the cylinder being operated by the pump-actuating means. I will preferably employ two delivery pipes or hose, one for the pump and one for the cylinder, either of which may be used according to the lubricating problem presented.

In order to give an understanding of the invention I have illustrated in the drawings a selected embodiment thereof which will now be described after which the novel features will be pointed out in the appended claims.

Fig. 1 is a vertical sectional view of an apparatus embodying my invention;

Fig. 2 is an end view of the pumping unit;

Fig. 3 is a section on the line 3—3, Fig. 2;

Fig. 4 is a section on the line 4—4, Fig. 2 with a portion of the pump casing broken out.

In the drawings 1 indicates generally a container adapted to contain grease or some other semi-fluid lubricant. This container is shown as mounted on wheels 2 so that it can be readily trundled from one place to another, this being a convenient arrangement when the device is used for lubricating automobiles because it provides for readily transporting the container to and from the automobile to be lubricated.

Situated within the container 1 near the bottom thereof is a pump 3 herein shown as a gear pump comprising the intermeshing gear members 4, 5. This gear pump has the inlet 6 and the discharge port or conduit 7 which communicates with a delivery hose 8 that is preferably flexible and is provided at its end with a delivery nozzle 9. The pump is driven from a shaft herein shown as extending vertically in the casing and as having the gear element 5 rigid therewith, said shaft having at its upper end a bevel gear 11 which meshes with a bevel gear 12 on a driving shaft 13 that is supported in suitable bearings 14 at the top of the casing, said shaft having a crank 15 thereon by which it may be operated.

The structure thus far described, which may be substantially as shown in said Thornton Patent No. 1,564,799, is satisfactory for dispensing grease or lubricant where only a moderate pressure is required to force the lubricant to the place to be lubricated. It frequently happens, however, in order to properly lubricate a bearing, especially some bearings in an automobile, that it is necessary to apply very high pressure to the grease. In accordance with the present invention this high pressure is secured by the high pressure unit comprising a cylinder 16 and a plunger 17 operating therein. The cylinder has an inlet port 18 which communicates through a duct 19 with the discharge port 7 of the gear pump. The cylinder also has a discharge port 20 which is controlled by a spring-pressed check valve 21, said port leading to a delivery hose 22 which may have at its end any suitable connection 23 for connecting it to the bearing to be lubricated. The plunger 17 is actuated from the shaft 10 by which the pump is driven and for this purpose the shaft has thereon an eccentric 24, the eccentric strap 25 of which is pivotally connected to the plunger as shown at 26.

The inlet port 18 of the high pressure cylinder 16 is situated adjacent the rear end thereof so that it is not uncovered or opened until the plunger has nearly reached the limit of its back stroke. During each back stroke of the plunger vacuum conditions will be formed in the cylinder 16 because the discharge port is closed by the check valve 21 and the inlet port is not opened until the plunger has reached the position shown in Fig. 3. As soon as the inlet port 18 is open the grease or lubricant will be quickly drawn into the cylinder 16 owing to the vacuum conditions therein and as soon as the piston begins its forward stroke it closes the inlet port and the lubricant thus trapped in the cylinder is forced through the discharge port 21 and delivered through the delivery pipe 22 under high pressure.

By having the inlet port in the position shown the relatively high vacuum conditions which exist in the cylinder at the time the inlet port is open will ensure that the grease will be drawn into the cylinder even though it is relatively stiff or non-fluid and this is an important feature of the construction as it ensures the proper operation of the device under varying conditions of temperature.

The communicating duct 19 leading to the inlet of the high pressure unit may conveniently be provided with a valve 27 so that said duct may be closed in case it is not necessary to use the high pressure attachment. This valve is shown as a plug valve which is opened and closed by a turning movement and it may conveniently be operated from the top of the container. For this purpose said valve is provided with an arm 28 to which is connected an actuating rod 29 that extends up through the container and is accessible from the top thereof.

When the high pressure unit is being used the nozzle 9 may be shut off by means of a valve 30 or said nozzle may be supported so that any grease delivered therefrom will be discharged back into the container as shown in Fig. 1.

Since the pump 3 is capable of handling a larger volume than the high pressure unit I have provided an overflow by-pass by which the surplus lubricant delivered from the pump 3 over and above that which is taken by the high pressure unit may be returned to the container. This overflow by-pass is shown at 31 and it leads from the duct 19 back to the container, it being controlled by a spring-pressed check valve 32. When the high pressure unit is operating any surplus grease will be forced through the by-pass 31 back into the container.

The cylinder 16, duct 19, overflow by-pass 31, may conveniently all be formed in the same housing or casting 33, which contains the pump housing. This casting is also shown as provided with a bearing arm 34 through which the shaft 10 extends and which forms a bearing therefor. The casting or housing 33 is herein shown as provided with two nipples 35, 36 which project through the side wall of the container 1 and to which the delivery pipes 8 and 22 are secured.

The operation of the device will be readily understood from the foregoing. If it is desired to deliver the lubricant under a moderate pressure then the valve 27 is closed and as the pump 3 is operated the lubricant will be delivered through the delivery pipe 8. On the other hand, if it is desirable or necessary to deliver the grease under high pressure to effect the desired lubrication then the valve 27 is opened and the valve 30 at the delivery nozzle 9 may be closed or said nozzle may be supported to discharge back into the container 1 as shown in Fig. 1. When the parts are thus adjusted and the shaft 10 is operated the plunger 17 will operate to force grease through the discharge pipe 22 under high pressure.

I claim:

1. In a device of the class described, the combination with a container, of a gear pump therein having a discharge port, a cylinder in the casing having an inlet port which communicates with the discharge port of the pump and also having an outlet port, a plunger in said cylinder, and means common to the pump and the plunger for operating both of them.

2. In a device of the class described, the combination with a container, of a gear pump therein, a high pressure unit comprising a cylinder having inlet and outlet ports, the inlet port communicating with the discharge of the gear pump, a check valve controlling the discharge port, a plunger in said cylinder, and means common to said gear pump and plunger for operating both of them, the inlet port to said cylinder being situated adjacent the rear end thereof, whereby during each return stroke of the piston relatively high vacuum conditions will be developed in the cylinder which will ensure the cylinder being filled with grease as soon as the plunger uncovers the inlet port.

3. In a device of the class described, the combination with a container, of a gear pump therein having a discharge port, a high pressure unit comprising a cylinder and a plunger operating therein, said cylinder having a discharge port at one end and an inlet port which communicates with the discharge of the gear pump and which is so situated that it is closed by the plunger during the initial forward movement thereof and is opened during the final return movement, an outwardly opening check valve controlling the discharge port of the cylinder, a shaft for operating the gear pump, and means for operating the plunger by the rotation of the shaft.

4. In a device of the class described, the combination with a container, of a gear pump therein having a discharge port, a high pressure unit comprising a cylinder and a plunger operating therein, said cylinder having a discharge port at one end and an inlet port which communicates with the discharge of the gear pump and which is so situated that it is closed by the plunger during the initial forward movement thereof and is opened during the final return movement, an outwardly opening check valve controlling the discharge port of the cylinder, a shaft for operating the gear pump, and means for operating the plunger by the rotation of the shaft, said high pressure unit having a smaller capacity than the gear pump, and an overflow by-pass to return to the container the surplus material delivered by the pump and not capable of being handled by the high pressure unit.

In testimony whereof, I have signed my name to this specification.

WILFRED B. MATHEWSON.